US008857542B2

(12) United States Patent
Hendrickson et al.

(10) Patent No.: US 8,857,542 B2
(45) Date of Patent: Oct. 14, 2014

(54) METHOD AND APPARATUS TO ELIMINATE FUEL USE FOR ELECTRIC DRIVE MACHINES DURING TROLLEY OPERATION

(75) Inventors: Matthew Hendrickson, Dunlap, IL (US); Donald Gilmore, Peoria, IL (US); Eric Ruth, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 79 days.

(21) Appl. No.: 13/314,650

(22) Filed: Dec. 8, 2011

(65) Prior Publication Data

US 2013/0146411 A1 Jun. 13, 2013

(51) Int. Cl.
*B60L 9/00* (2006.01)
*B60L 11/02* (2006.01)
*B60L 11/14* (2006.01)

(52) U.S. Cl.
USPC ............ 180/65.1; 318/375; 180/65.285; 701/22; 701/112

(58) Field of Classification Search
USPC ........ 318/375; 180/65.1–65.285; 701/22–112
See application file for complete search history.

(56) References Cited

U.S. PATENT DOCUMENTS

| | | | |
|---|---|---|---|
| 5,103,923 A | | 4/1992 | Johnston et al. |
| 5,293,947 A * | | 3/1994 | Stratton ..................... 180/2.1 |
| 6,803,734 B2 | | 10/2004 | Kumar et al. |
| 7,005,819 B2 | | 2/2006 | Takai et al. |
| 7,034,480 B2 | | 4/2006 | Kumar et al. |
| 7,061,131 B2 | | 6/2006 | King et al. |
| 7,078,877 B2 * | | 7/2006 | Salasoo et al. ............... 320/104 |
| 7,190,133 B2 | | 3/2007 | King et al. |
| 7,231,877 B2 | | 6/2007 | Kumar |
| 7,689,331 B2 * | | 3/2010 | Moran ........................... 701/22 |
| 7,885,737 B2 * | | 2/2011 | Hirata et al. ................... 701/22 |
| 8,188,692 B2 * | | 5/2012 | Kumar ......................... 318/376 |
| 2006/0076171 A1 * | | 4/2006 | Donnelly et al. ............ 180/65.2 |
| 2006/0086547 A1 | | 4/2006 | Shimada et al. |
| 2007/0144398 A1 * | | 6/2007 | Kumar et al. ................... 105/50 |

(Continued)

FOREIGN PATENT DOCUMENTS

DE   102008037661 A1 *  2/2010
EP       1245431 A2 * 10/2002

(Continued)

OTHER PUBLICATIONS

Co-Pending U.S. Appl. No. 12/860,661, filed Aug. 20, 2010, by Marchand et al., "Method and System for Eliminating Fuel Consumption During Dynamic Braking of Electric Drive Machines".

*Primary Examiner* — Eduardo Colon Santana
*Assistant Examiner* — Said Bouziane
(74) *Attorney, Agent, or Firm* — Jeff A. Greene

(57) ABSTRACT

A drive system for a machine having an engine, a generator, a trolley drive arrangement, a motor, wheels and auxiliary devices is provided. The drive system includes an inverter circuit and an auxiliary driver both being operatively connected to the trolley drive arrangement. The inverter circuit may be coupled to each of the generator and the motor. The auxiliary driver may be coupled to each of the generator and the auxiliary devices. The inverter circuit and the auxiliary driver may be configured to automatically communicate power from the trolley drive arrangement and any power from the auxiliary devices to the motor in a trolley propel mode, and automatically communicate power from the motor to the engine, the trolley drive arrangement, and optionally to a hybrid system if applicable, in a dynamic braking mode, while attached to trolley lines so as to eliminate fuel consumption while attached to the trolley lines.

24 Claims, 10 Drawing Sheets

(56) References Cited

U.S. PATENT DOCUMENTS

2008/0265812 A1 10/2008 Adra
2009/0045761 A1 2/2009 Fuchs et al.
2009/0072772 A1 3/2009 Fuchs et al.
2011/0094841 A1* 4/2011 Mazumdar et al. ......... 191/33 R

FOREIGN PATENT DOCUMENTS

| | | |
|---|---|---|
| KR | 1020110048106 | 5/2011 |
| WO | 9108121 | 6/1991 |
| WO | WO 2005077702 A1 * | 8/2005 |
| WO | 2008064716 | 6/2008 |

* cited by examiner

METHOD AND APPARATUS TO ELIMINATE FUEL USE FOR ELECTRIC DRIVE MACHINES DURING TROLLEY OPERATION

TECHNICAL FIELD

The present disclosure relates generally to the operation of electric drive machines, and more particularly, to systems and methods that eliminate fuel consumption during trolley operation and dynamic braking.

BACKGROUND

Electric drive systems for machines typically include a power circuit that selectively activates at least one motor at a desired torque. The motor is typically connected to a wheel or other traction device that operates to propel the machine. An electric drive system includes a prime mover, for example, an internal combustion engine that drives a generator. The generator produces electrical power that is used to drive the motor. When the machine is propelled, mechanical power produced by the engine is converted to electrical power at the generator. This electrical power is often processed and/or conditioned before being supplied to the motor. The motor transforms the electrical power back into mechanical power to drive the wheels and propel the vehicle. Some machines having an electrical drive system that utilizes an external source of power during certain modes of operation. Such a machine for example may be an electric drive mining truck. When such a machine is propelled fully loaded and connected to a trolley system, power is fed to the propel motors and converted to mechanical power to drive the machine.

The machine is retarded in a mode of operation during which the operator desires to decelerate the machine. To retard the machine in this mode, the power from the engine is reduced. Typical machines may also include service brakes and other mechanisms for retarding to decelerate and/or stop the machine. As the machine decelerates, the momentum of the machine is transferred to the motor via rotation of the wheels. The motor acts as a generator to convert the kinetic energy of the machine to electrical energy that is supplied to the drive system. This electrical energy is typically dissipated (wasted) across an electrical grid, stored in chargeable cells such as batteries or capacitors for later use, or partially used to power auxiliary components such as blowers for cooling retarding grids.

Some machines, such as some hybrid machines, are configured to store the electrical energy provided by the motor during a retarding mode of operation in energy storage devices or batteries for later use. The stored energy is used to power auxiliary devices and/or drive motors during idling or propel modes of operation so as to minimize engine involvement and reduce fuel consumption. Although such storage configurations may reduce fuel consumption during retarding modes, the extra weight added to the vehicle may in fact increase fuel consumption during propel modes. Implementing storage configurations also introduces significant cost and technological limitations, among other things.

A favored alternative to storage configurations serves to simply waste the energy in the form of heat via a dynamic braking retarding grid of resistors and insulators. To minimize overheating, a grid cooling system having an electrically driven blower is often used to help dissipate the heat from the retarding grid. The blower motor is powered by the waste energy such that the engine is not required to cool the retarding grid. However, retarding grid configurations introduce several control limitations. Among other things, these configurations prohibit operation of the grid cooling system without providing significant braking force. More specifically, because the grid cooling system is powered only by waste energy that is supplied by the motor during retarding modes, the grid cooling system is unable to operate once the machine exits the retarding mode without absorbing a prohibitively large amount of power from the engine and consuming diesel fuel. These systems are susceptible to temperature overshoot conditions, or conditions in which the temperatures of the resistive elements and insulators of the retarding grid sharply increase once a blower is shut off. Furthermore, in low-power retarding modes, or when the retarding arrangement is operating at less than nominal power, the shared DC bus of the drive system may collapse due to the comparatively large retarding requirement. Additionally, these systems still require the engine to be operated at lower RPMs and may reduce fuel consumption, but the engine is still needed to operate other auxiliary devices (i.e. parasitic loads).

Control systems which redirect the electrical energy generated from motors during retarding or braking modes of operation, or regenerative energy, back into the engine are known to those skilled in the art as a means to reduce fuel consumption and improve efficiency. Some existing control systems include a drive system that feeds power generated by traction motors during dynamic braking back into the main alternator to rotate the engine. However, the retarding grids and the grid cooling mechanisms of such systems are linked to the same bus, and thus, cannot be independently controlled. Furthermore, all of these systems specifically require switching of a transfer switch in order to redirect power to the engine during dynamic braking modes.

Therefore, there is a need for a drive system and method that eliminates fuel consumption during certain propel modes and during dynamic braking modes of operation. Specifically, there is a need for an electric drive system and method that automatically and more efficiently redirects power generated at the fraction motor into the engine during dynamic braking modes. There is also a need for an electric drive system and method which provides control of a grid cooling system that is independent from control of the associated retarding grid.

SUMMARY OF THE DISCLOSURE

In one aspect of the present disclosure, a drive system is disclosed for a machine having an engine coupled to a generator, a motor operatively coupled to drive wheels, and auxiliary devices. The drive system includes an inverter circuit coupled to each of the generator and the motor, and an auxiliary driver coupled to each of the generator and the auxiliary devices. A trolley drive arrangement is coupled to the inverter circuit and configured to automatically communicate external power to the motor and to the engine in a trolley propel mode, and automatically communicate power from the motor to the engine and the trolley drive arrangement in a dynamic braking mode so as to eliminate fuel consumption during the trolley propel and dynamic braking modes.

In another aspect of the disclosure, an electric drive machine is disclosed. The electric drive machine includes an engine, a generator operatively coupled to the engine, a motor operatively coupled to one or more drive wheels, an inverter circuit coupled to each of the generator and the motor, a trolley drive arrangement, and an auxiliary driver coupled to each of the generator and the auxiliary devices. The trolley drive arrangement is coupled to the inverter circuit. The inverter circuit and the auxiliary driver are configured to automatically communicate power from the trolley drive arrangement to the motor in a propel mode, and automatically communicate power from the motor to the generator in a dynamic braking mode. The auxiliary driver is configured to transmit power to a DC bus during the trolley propel and dynamic braking modes. The electric drive machine additionally includes a retarding grid coupled to the inverter circuit, and a grid cooling system coupled to the DC bus and configured to selectively cool the retarding grid. Control of the grid cooling system is independent from control of the retarding grid.

In yet another aspect of the disclosure, a method for eliminating fuel consumption during trolley propel and dynamic braking of an electric drive machine is disclosed. The machine includes at least an engine coupled to a generator, a motor operatively coupled to drive wheels, and auxiliary devices. The method provides an inverter circuit in electrical communication between the generator and the motor as well as an auxiliary driver in electro-mechanical communication between the generator and the auxiliary devices. The method further determines a current mode of operation of the electric drive machine, automatically directs electrical power from the trolley drive arrangement to the motor in a trolley propel mode through at least one of the inverter circuit and the auxiliary driver if the current mode of operation is in trolley propel mode, and automatically directs electro-mechanical power from the motor a to a one of the engine and the trolley drive arrangement in a dynamic braking mode through at least one of the inverter circuit and the auxiliary driver if the current mode of operation is in a dynamic braking mode.

DETAILED DESCRIPTION

Figure 1:
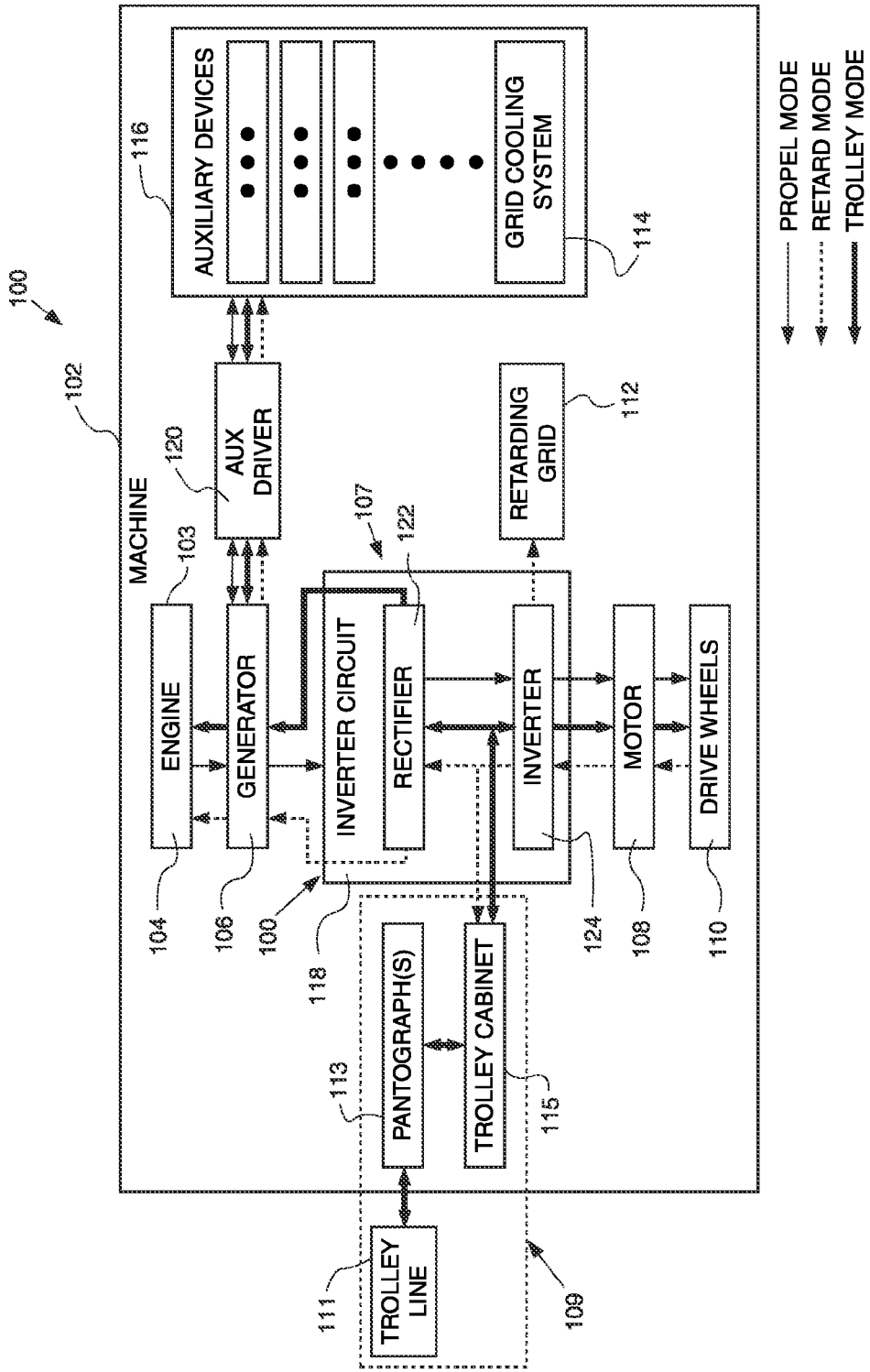
FIG. 1 is a general schematic view of an exemplary drive system as applied to an electric drive machine.

Referring to FIG. 1 schematically illustrates an exemplary drive system 100 as applied to a machine 102, such as for example an electric drive off-road truck. The machine 102 typically includes a prime mover 103 such as an internal combustion engine 104, a generator 106, power electronics 107, one or more motors 108, one or more wheels 110, a retarding grid 112, a grid cooling system 114 and one or more auxiliary devices 116. In this example, drive system 100 also involves a trolley drive arrangement 109 such as a trolley lines 111 which includes two overhead lines as is recognized in the industry but are not shown. It should be noted here that the trolley lines 111 may be provided to propel the machine in an up hill direction, or a down hill direction depending on where the load and dump locations are positioned. The trolley drive arrangement 109 also includes a pantograph(s) 113 positioned on the machine to connect to the trolley lines 111, and a trolley cabinet 115 interfaces the pantograph(s) 113 with the power electronics 107. As shown, power electronics 107 is provided with at least an inverter circuit 118 and an auxiliary driver 120. The inverter circuit 118 may include one or more rectifiers 122, inverters 124, or any combination thereof, and be disposed between the generator 106 and the motor 108. The auxiliary driver 120 may be disposed between the generator 106 and the auxiliary devices 116 and include an auxiliary generator, winding assembly, DC motor, or any other means for allowing bidirectional electrical communication therebetween.

During a standard propel mode of operation, or when the machine 102 is being accelerated, power may be transferred from the engine 104 and toward the wheels 110, as indicated by solid arrows, to cause movement. Specifically, the engine 104 may produce an output torque to the generator 106, which in turn converts the mechanical torque into electrical power. The electrical power may be generated in the form of alternating current (AC) power. The AC power may then be converted to direct current (DC) and converted again to the appropriate amount of AC power by the inverter circuit 118. The resulting AC power may then be used to drive the one or more motors 108 and the wheels 110, as is well known in the art. Also, during the propel mode, the auxiliary driver 120 may communicate any power supplied by the generator 106 to one or more auxiliary devices 116, and/or communicate any power supplied by one or more auxiliary devices 116 to the generator 106 so as to at least partially drive the engine 104 and the motors 108 as described above.

Alternatively, during a trolley propel mode of operation when the machine 102 is being accelerated, power may be transferred from the trolley lines 111 to the power electronics 107 toward the wheels 110, as indicated by dark solid arrows, to cause movement. Specifically, electrical power from the trolley lines 111 in the form of direct current (DC) is converted to the appropriate amount of AC power by the inverter 124. The resulting AC power is then be used to drive the one or more motors 108 and the wheels 110, as was described above. Also, during the propel mode, power supplied from the trolley lines 111 back driving the generator 106 thus supplying power to the auxiliary driver 120 to one or more auxiliary devices 116, and/or communicate any power supplied by one or more auxiliary devices 116 to the generator 106 so as to at least partially drive the engine 104 and the motors 108 as described above. Power from one or more auxiliary devices 116 may also be provided back to the trolley lines 111.

During a dynamic braking mode of operation, or when the motion of the machine 102 is to be retarded, power may be generated by the mechanical rotation at the wheels 110 and directed toward the retarding grid 112, as indicated by dashed arrows and/or back to the trolley lines 111. In particular, the kinetic energy of the machine 102 may be converted into rotational power at the wheels 110. Rotation of the wheels 110 may further rotate the motor 108 so as to generate electrical power, for example, in the form of AC power. The inverter circuit 118 may serve as a bridge to convert the power supplied by the motor 108 into DC power. Dissipation of the DC power generated by the motor 108 may produce a counter-rotational torque at the wheels 110 to decelerate the machine 102. Such dissipation may be accomplished by passing the generated current provided by the inverter circuit 118 through a resistance, such as the retarding grid 112 shown and may also supply power back to the trolley lines 111. Excess electricity may be communicated, by the trolley lines 111, back to a central charge unit at an electrical substation (not shown) or transformed into heat generated at the retarding grid 112 and be expelled using the grid cooling system 114. Power to the grid cooling system 114 may be supplied by the generator 106 or the trolley lines 111 via a communication path through the auxiliary driver 120. Similarly, the auxiliary driver 120 may supply power provided by the generator 106 or the trolley lines 111 to any one or more of the auxiliary devices 116 available on the machine 102.

Figure 2:
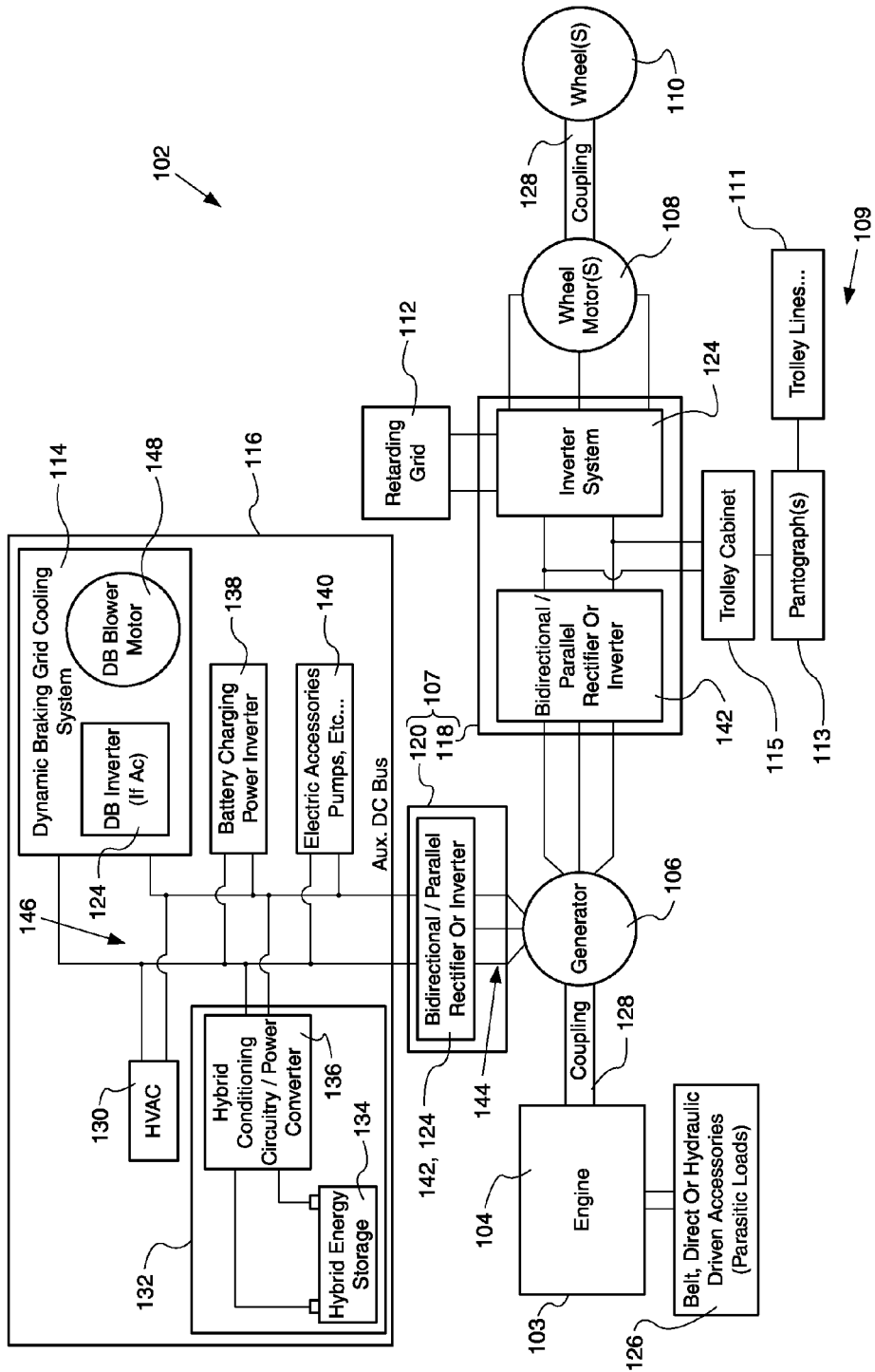
FIG. 2 is a detailed schematic view of another exemplary drive system.

Referring now to FIG. 2, a more detailed schematic of an example of the drive system 100 as applied to machine 102 is provided. As in the example of FIG. 1, the machine 102 of FIG. 2 also includes prime mover 103, such as the engine 104, which serves as the machine's primary source of power. The engine 104 may be configured to provide direct or indirect power to parasitic loads 126 via belts, hydraulic systems, and the like. The engine 104 may be mechanically coupled to generator 106 through a coupling 128. The machine 102 has one or more motors 108 mechanically coupled to one or more wheels 110 via another coupling 128. Machine 102 also includes a retarding grid 112, a grid cooling system 114 and auxiliary devices 116 may also be provided. The auxiliary devices 116 may include, for example, a heating, ventilation and air conditioning (HVAC) system 130, a hybrid system 132 having an energy storage device 134 and conditioning circuitry 136, a battery charging device 138, or any electrically driven pump or accessory 140.

As shown in FIG. 2, the drive system 100 may provide the machine 102 with at least an inverter circuit 118 to provide electrical communication between the generator 106 and/or the trolley lines 111 to the motor 108. The inverter circuit 118 may include a configuration of one or more rectifiers 122 and inverters 124 as shown in FIG. 1. In an alternative example, the inverter circuit 118 provides a parallel configuration of inverters 124 and/or a bidirectional inverter 142 in place of, for example, the rectifier 122 of FIG. 1, so as to enable bidirectional communication of electrical power between the generator 106 and/or the trolley lines 111 to the motor 108. The inverter circuit 118 may additionally be electrically coupled to the retarding grid 112 so as to dissipate any excess energy therethrough and/or send a portion of the electrical power back to the trolley lines 111. Alternatively, any one or more of the auxiliary devices 116, such as the hybrid system 132, may also direct any energy generated therefrom toward the auxiliary driver 120 and/or the generator 106.

Still referring to FIG. 2, the drive system 100 may further provide the machine 102 with an auxiliary driver 120 to provide electrical communication between the generator 106 and the auxiliary devices 116. More specifically, the auxiliary driver 120 may include a winding assembly 144 or a series of tapped windings electrically coupled to the generator 106 so as to transform AC power supplied by the generator 106 to an appropriate amount of AC power as needed by the auxiliary devices 116. The auxiliary driver 120 may also provide a parallel configuration of inverters 124 or a bidirectional inverter 142 to convert AC power from the generator 106 to the appropriate DC power necessary for driving the auxiliary devices 116. Additionally, when in trolley propel mode DC power from the trolley lines 111 is converted by bidirectional inverter 142 to AC power to operate the generator 106 as a motor and winding assembly 144 as to transform AC power supplied by the trolley lines 111 to an appropriate amount of AC power as needed by the auxiliary devices 116. As described before, the auxiliary driver 120 may use the converted AC power from the trolley lines 111 to the appropriate DC power necessary for driving the auxiliary devices 116.

The DC power provided by the bidirectional inverter 142 may be supplied in parallel to each of the auxiliary devices 116 via a DC bus 146, link, or the like. Similarly, DC power provided by the auxiliary devices 116 may be transmitted to the auxiliary driver 120 via the DC bus 146, converted into AC power via the bidirectional inverter 142, and supplied to the generator 106 via the winding assembly 144. This AC power may also be converted by the bidirectional inverter 142, and supplied back to the trolley lines 111 for storage at a central charge unit at an electrical substation (not shown). The auxiliary driver 120 may also be configured to selectively control power to an inverter 124 and/or a blower motor 148 of the grid cooling system 114 via the DC bus 146 in a manner that is independent from control of the retarding grid 112. As power to the grid cooling system 114 via the DC bus 146 is supplied independently from power to the retarding grid 112, the grid cooling system 114 may be enabled when predetermined temperature thresholds of the retarding grid 112 are exceeded regardless of the operating mode of the machine 102.

Figure 3:
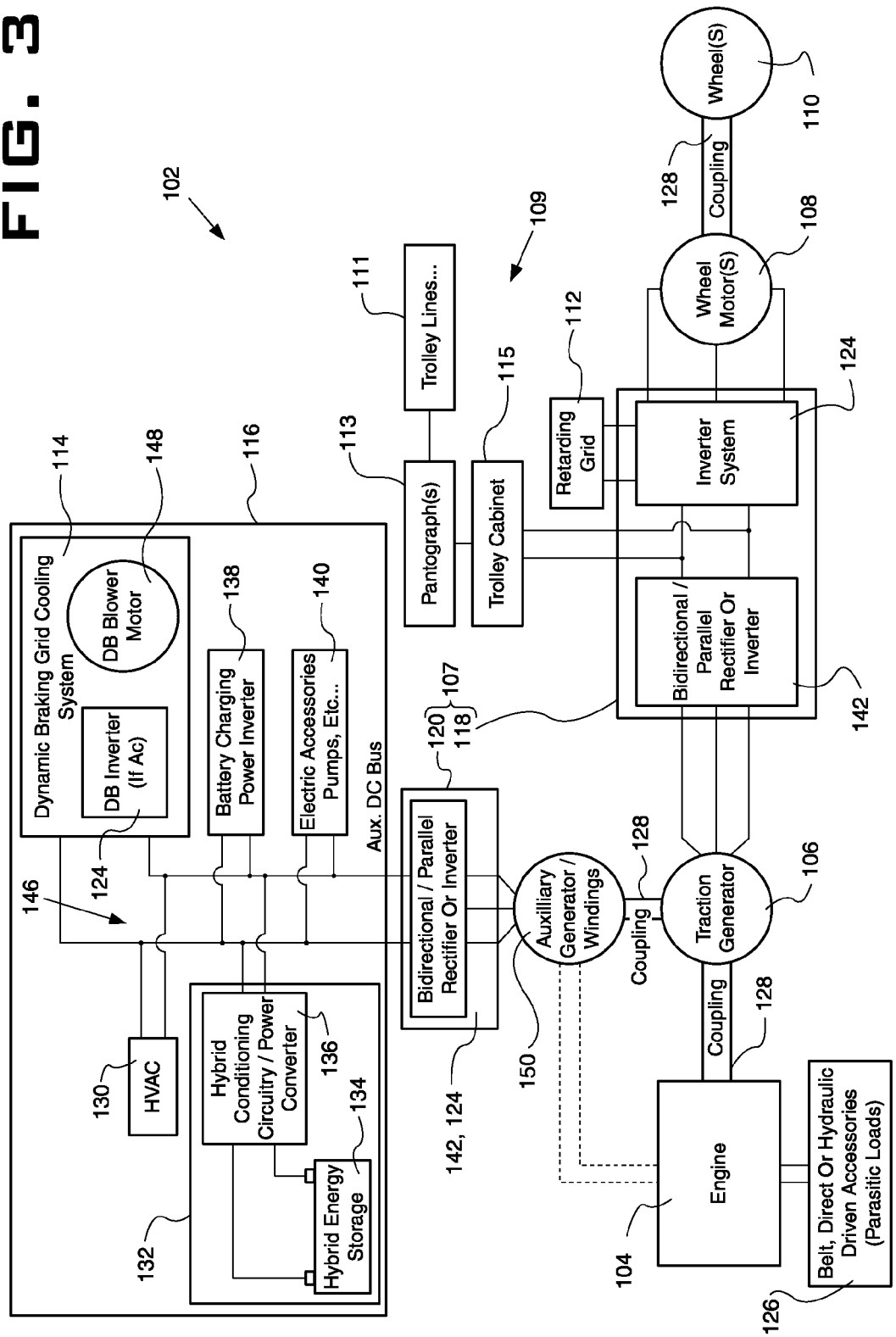
FIG. 3 is a detailed schematic view of another exemplary drive system.

Turning to FIG. 3, an exemplary schematic of another drive system 100 as applied to machine 102 is provided. As in previous examples, machine 102, of FIG. 3, may include engine 104 configured to provide power to parasitic loads 126 via belts, hydraulic systems, and the like. The engine 104 may also be mechanically coupled to generator 106 through coupling 128, or the like. Movement of the machine 102 may be provided by one or more motors 108 that are mechanically coupled to one or more wheels 110 via a coupling 128. The machine 102 may additionally provide a retarding grid 112 and a grid cooling system 114 having an inverter 124 and a blower motor 148 for actively cooling the retarding grid 112. In addition to the grid cooling system 114, auxiliary devices 116 may include a heating, ventilation and air conditioning (HVAC) system 130, a hybrid system 132 having an energy storage device 134 and conditioning circuitry 136, a battery charging device 138, or any other electrically driven pump or accessory 140.

As in the example of FIG. 2, the drive system 100 of FIG. 3 may provide the machine 102 with at least an inverter circuit 118 to provide electrical communication between the generator 106 and/or the trolley lines 111 to the motor 108. The inverter circuit 118 may provide a parallel configuration of inverters 124 and/or a bidirectional inverter 142 in place of, for example, the rectifier 122 of FIG. 1, so as to enable bidirectional communication of electrical power between the generator 106 and/or the trolley lines 111 to the motor 108. The inverter circuit 118 may additionally be electrically coupled to the retarding grid 112 and configured to dissipate any excess energy therethrough and/or send a portion of the electrical power back to the trolley lines 111. Alternatively, any one or more of the auxiliary devices 116, such as the hybrid system 132, may also direct any energy generated therefrom toward the auxiliary generator 150.

The drive system 100 may also provide an auxiliary driver 120 to provide electrical communication between the generator 106 or the trolley lines 111 and the auxiliary devices 116. In contrast to the winding assembly 144 of FIG. 2, the auxiliary driver 120 may include an auxiliary generator 150 that is mechanically coupled to the main or generator 106 as shown. Similar to the winding assembly 144, the auxiliary generator 150 may serve to convert any AC power supplied by the generator 106 to an appropriate amount of AC power as needed by, for example, the auxiliary devices 116. Similarly DC power from the trolley lines 111 may be converted to AC power by the bidirectional inverter 142 may drive the generator 106 acting as a motor to drive the auxiliary generator 150 to an appropriate amount of AC power as needed by the auxiliary devices 116. A parallel configuration of inverters 124 or a bidirectional inverter 142 may also be provided to convert any AC power from the auxiliary generator 150 to the appropriate DC power necessary for driving the auxiliary devices 116. The DC power provided by the bidirectional inverter may be supplied in parallel to each of the auxiliary devices 116 via DC bus 146, link, or the like. Similarly, any DC power provided by the auxiliary devices 116 may be transmitted to the auxiliary driver 120 via the DC bus 146, converted into AC power via the bidirectional inverter 142 and supplied to the generator 106 via the auxiliary generator 150. This AC power may also be converted by the bidirectional inverter 142, and supplied back to the trolley lines 111 for storage at a central charge unit at an electrical substation (not shown). The auxiliary driver 120 may also be configured to selectively control power to the grid cooling system 114 via the DC bus 146 in a manner that is independent from control of the retarding grid 112.

Figure 4:
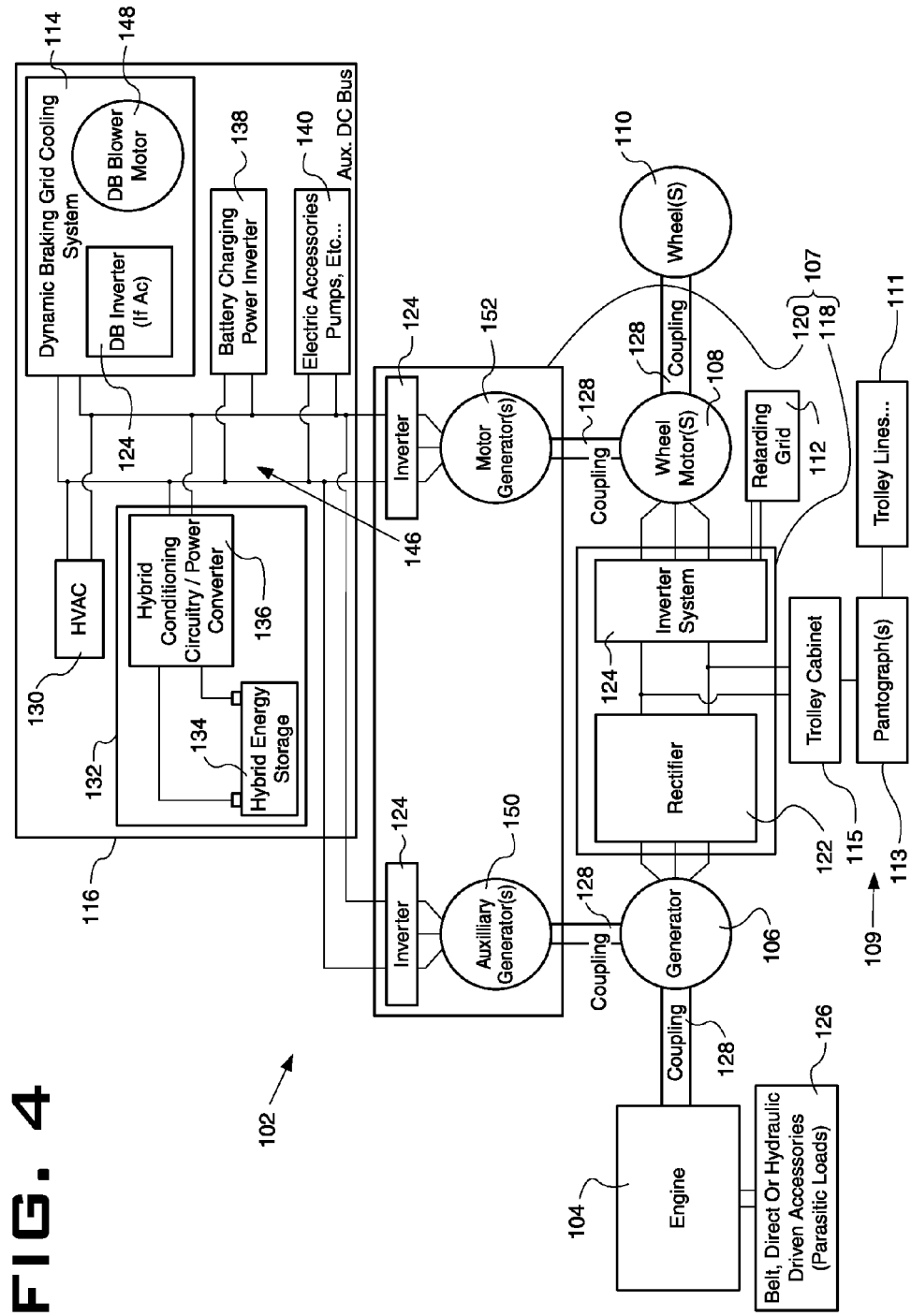
FIG. 4 is a detailed schematic view of another exemplary drive system.

In alternative examples drive system 100 may be modified and fitted onto machines 102 with pre-existing electric drive configurations, as shown for example in FIG. 4. As in previous examples, the machine 102 of FIG. 4 includes engine 104 configured to supply power to parasitic loads 126 via belts, hydraulic systems, and the like, as well as to generator 106 via a mechanical coupling 128, or the like. The machine 102 may further include one or more motors 108 for driving one or more wheels 110 via a mechanical coupling 128. Additionally, the machine 102 may support a retarding grid 112 and a grid cooling system 114 having an inverter 124 and a blower motor 148 for actively cooling the retarding grid 112. In addition to the grid cooling system 114, the auxiliary devices 116 may include a heating, ventilation and air conditioning (HVAC) system 130, a hybrid system 132 having an energy storage device 134 and conditioning circuitry 136, a battery charging device 138, or any other electrically driven pump or accessory 140.

In contrast to the examples of FIGS. 2 and 3, the drive system 100 of FIG. 4 may correspond to a pre-existing inverter configuration, or the inverter circuit 118 shown. Moreover, the inverter circuit 118 may include at least one rectifier 122 and an inverter 124, both of which are configured to transmit power unidirectionally from the generator 106 and/or the trolley lines 111 toward the motor 108. The inverter circuit 118 may additionally be electrically coupled to the retarding grid 112 and configured to dissipate any excess energy therethrough.

As the inverter circuit 118 of FIG. 4 prohibits the return of any electrical energy that is generated by the motor 108 during dynamic braking or retarding modes, the auxiliary driver 120 may be configured to redirect any such energy back to the engine 104 as shown. Specifically, in addition to an auxiliary generator 150 that is mechanically coupled to the engine 104 and/or the generator 106, the auxiliary driver 120 may further include a motor generator 152 that is mechanically coupled to the motor 108, the wheels 110 and/or any other means for causing motion. The motor generator 152 may be configured to transmit any mechanical energy that is supplied by the motor 108 and/or the wheels 110 during dynamic braking and/or trolley mode of operation through an inverter 124 to be converted into DC power. The converted electrical energy may be passed through a DC bus 146 and then transmitted to a second inverter 124 that is coupled to the auxiliary generator 150. The auxiliary generator 150 may convert the received electrical energy into mechanical energy used to drive the engine 104 during dynamic braking and trolley modes. The DC bus 146 may also be configured to supply converted DC power to any one or more of the auxiliary devices 116 including the grid cooling system 114. As in previous examples, the drive system 100 may enable selective control of the grid cooling system 114 that is independent from control of the retarding grid 112. Alternatively, any one or more of the auxiliary devices 116, such as the hybrid system 132, may also communicate any energy generated therefrom toward the auxiliary generator 150.

Figure 5:
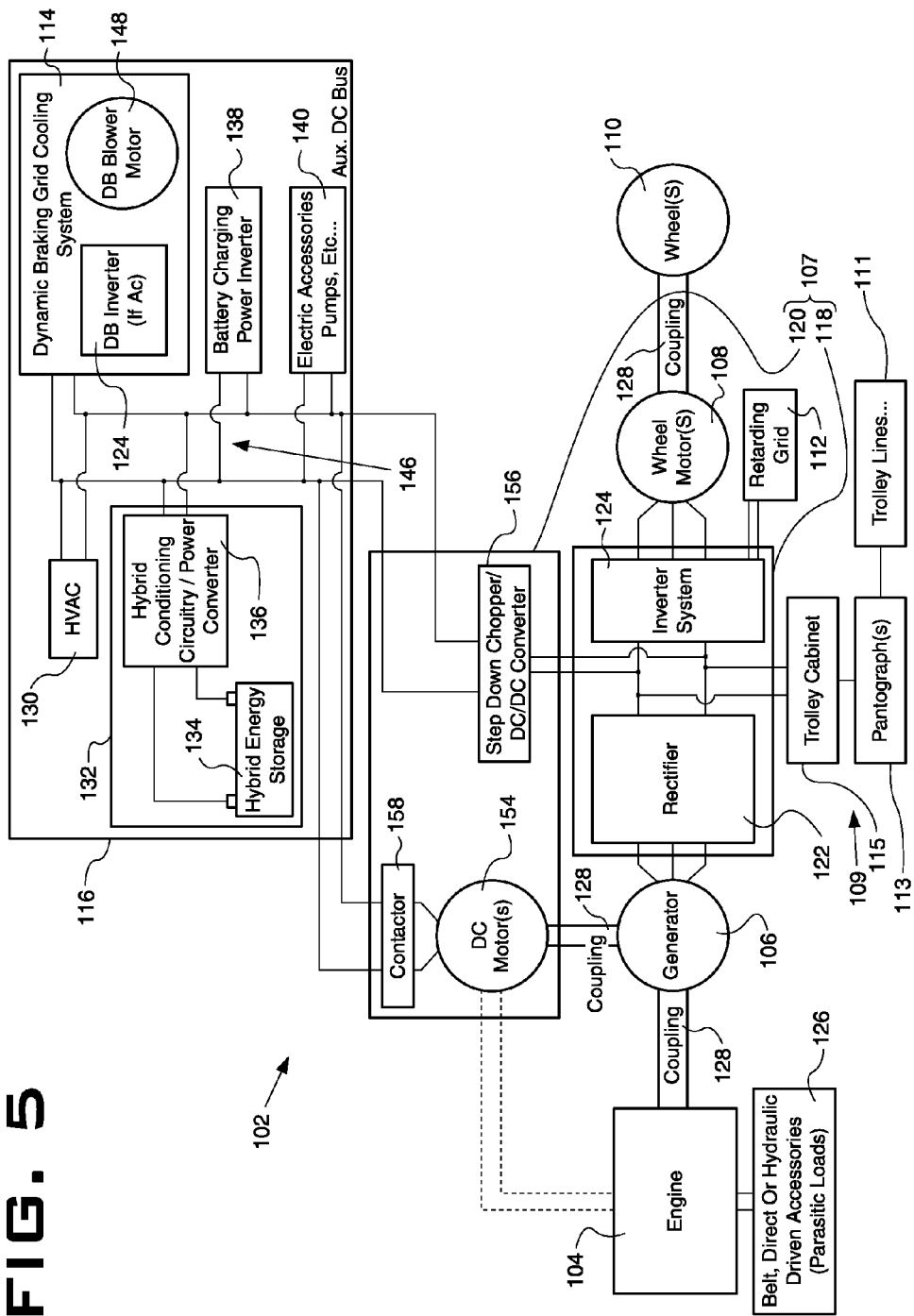
FIG. 5 is a detailed schematic view of another exemplary drive system.

In a similar example drive system 100 may be modified and fitted onto machines 102 with pre-existing electric drive configurations, as shown for example in FIG. 5. As in previous examples, the machine 102 of FIG. 5 includes engine 104 configured to supply power to parasitic loads 126 via belts, hydraulic systems, and the like, as well as to generator 106 via a mechanical coupling 128, or the like. The machine 102 may further include one or more motors 108 for driving one or more wheels 110 via a mechanical coupling 128. Additionally, the machine 102 may support a retarding grid 112 and a grid cooling system 114 having an inverter 124 and a blower motor 148 for actively cooling the retarding grid 112. In addition to the grid cooling system 114, the auxiliary devices 116 may include a heating, ventilation and air conditioning (HVAC) system 130, a hybrid system 132 having an energy storage device 134 and conditioning circuitry 136, a battery charging device 138, or any other electrically driven pump or accessory 140.

In contrast to the examples of FIGS. 2 and 3, the drive system 100 of FIG. 5 may correspond to a pre-existing inverter configuration, or the inverter circuit 118 shown. Moreover, the inverter circuit 118 may include at least one rectifier 122 and an inverter 124, both of which are configured to transmit power unidirectionally from the generator 106 and/or the trolley lines 111 toward the motor 108. The inverter circuit 118 may additionally be electrically coupled to the retarding grid 112 and configured to dissipate any excess energy therethrough.

As the inverter circuit 118 of FIG. 5 prohibits the return of any electrical energy that is generated by the motor 108 during dynamic braking or retarding mode, the auxiliary driver 120 may be configured to redirect any such energy back to the engine 104 as shown. Specifically, in addition to a DC motor 154 that is mechanically coupled to the engine 104 and/or the generator 106, the auxiliary driver 120 may further include a DC/DC converter such as a step down chopper 156 that is electrically coupled to the inverter circuit 118. The DC/DC converter 156 may be configured to transmit any electrical energy that is supplied by the trolley drive arrangement 109 during dynamic braking or retarding mode to the auxiliary devices 116 during trolley mode of operation. The electrical energy may be passed through DC bus 146 and then transmitted to through a contactor 158 and supplied to DC motor 154. The DC motor 154 is connected to the generator 106 by coupling 128 and used to drive the engine 104 during dynamic braking and trolley modes. The DC bus 146 may also be configured to supply DC power to any one or more of the auxiliary devices 116 including the grid cooling system 114. As in previous examples, the drive system 100 may enable selective control of the grid cooling system 114 that is independent from control of the retarding grid 112. Alternatively, any one or more of the auxiliary devices 116, such as the hybrid system 132, may also communicate any energy generated therefrom toward the DC motor 154 to the generator 106.

Figure 6:
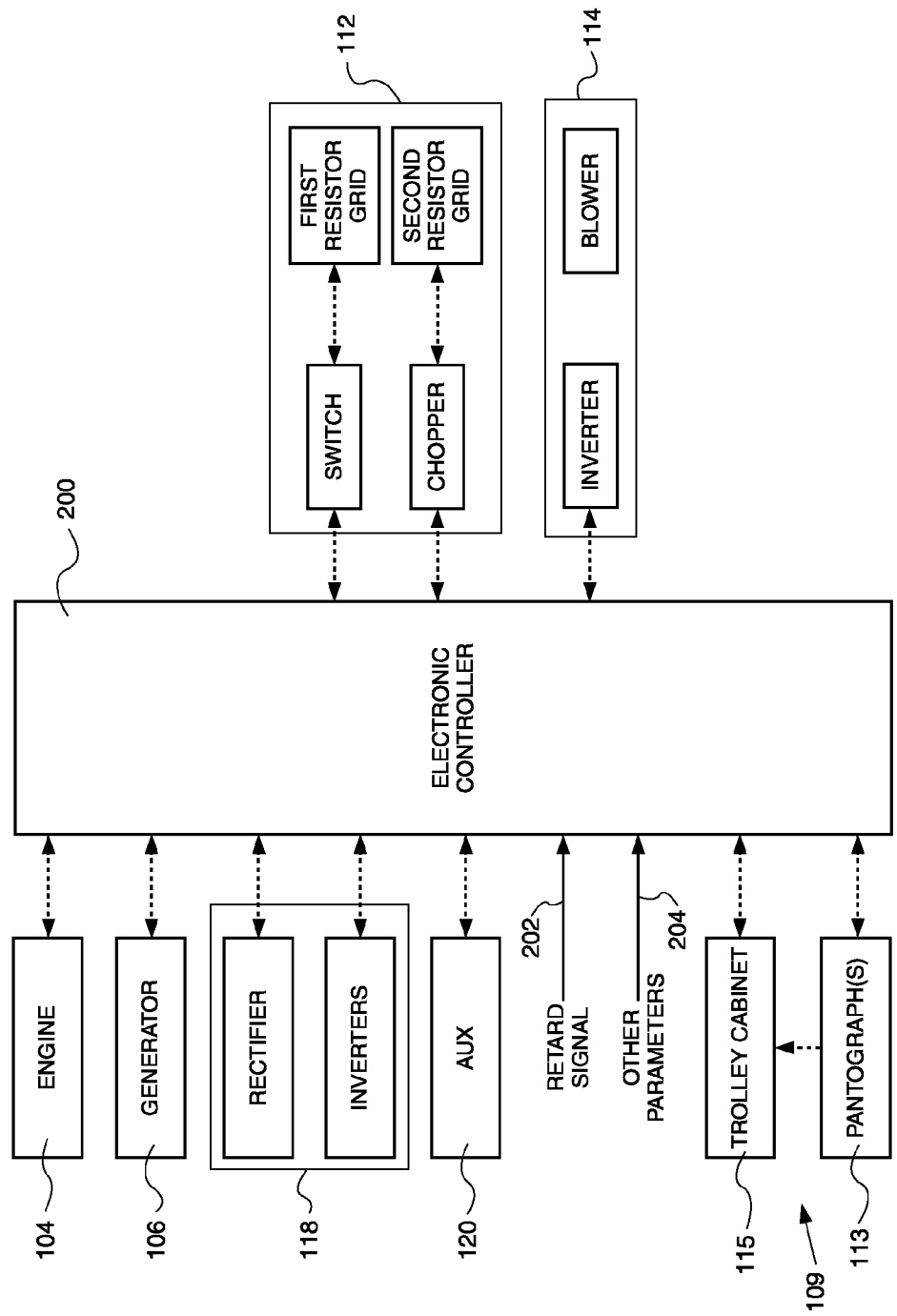
FIG. 6 is a schematic view of an exemplary controller for an electric drive system.

Overall control of the drive system 100 as well as the machine 102 may be managed by a controller 200 of the machine 102, as shown in FIG. 6. The controller 200 may take the form of one or more processors, microprocessors, microcontrollers, electronic control modules (ECMs), electronic control units (ECUs), or any other suitable means for electronically controlling functionality of the drive system 100 and/or machine 102. The controller 200 may be configured to operate according to a predetermined algorithm or set of instructions for controlling the drive system 100 based on the various operating conditions of the machine 102. Such an algorithm or set of instructions may be read into an on-board memory of the controller 200, or preprogrammed onto a storage medium or memory accessible by the controller 200, for example, in the form of a floppy disk, a hard disk, optical medium, random access memory (RAM), read-only memory (ROM), or any other suitable computer-readable storage medium commonly used in the art.

As shown in FIG. 6, the controller 200 may be in electrical communication with the engine 104, the generator 106, the inverter circuit 118, the auxiliary driver 120, the trolley drive arrangement 109, the retarding grid 112, the grid cooling system 114, and the like. The controller 200 may also be coupled to various other components, systems or subsystems of the machine 102. By way of such connections, the controller 200 may receive data pertaining to the current operating parameters of the drive system 100 and the machine 102 as input signals. The input signals may be provided by, for example, a plurality of sensors associated with each component. In response to such input, the controller 200 may perform the necessary determinations and transmit any output signals corresponding to the actions that need to be performed. The output signals may be integrated commands that are transmitted to various actuators or electronic devices, such as transistors or actuators, which are associated with the relevant components. The controller 200 may also be electrically coupled to any other component or device of the machine 102 that may be related to the inverter circuit 118, auxiliary driver 120, trolley drive arrangement 109, retarding grid 112, grid cooling system 114, and the like.

During operation of the machine 102, the controller 200 may receive a retarding command from an input node 202. The retarding command provided at the input node 202 may be generated in response to displacement of a manual control by the operator of the machine 102. The retarding command may alternatively be a command signal generated by the controller 200, or another controller of the machine that monitors or governs the speed of the machine 102, for example, a speed governor or a speed limiter. The controller 200 may receive and interpret the retarding command according to a control system or algorithm operating therein. The control system may determine a magnitude of the retarding being commanded, for example, in units of energy or power. Based on such data, the controller 200 may determine the degree of energy to be dissipated and respond accordingly. In examples having two retarding grids 112, for example, the controller 200 may determine whether first, second, or both retarding grids 112 should provide a contribution to retarding energy dissipation. Alternatively, a portion of the retarding energy may be directed back to the trolley lines 111 to aid in the energy dissipation. This determination or calculation may be based on various machine operating parameters. The parameters may include the current speed, the payload, the rate of acceleration, the desired speed, the inclination, the rate of change of the command to retard the machine 102, and the like, which may be input to the controller 200 via one or more additional input nodes 204.

Figure 7:
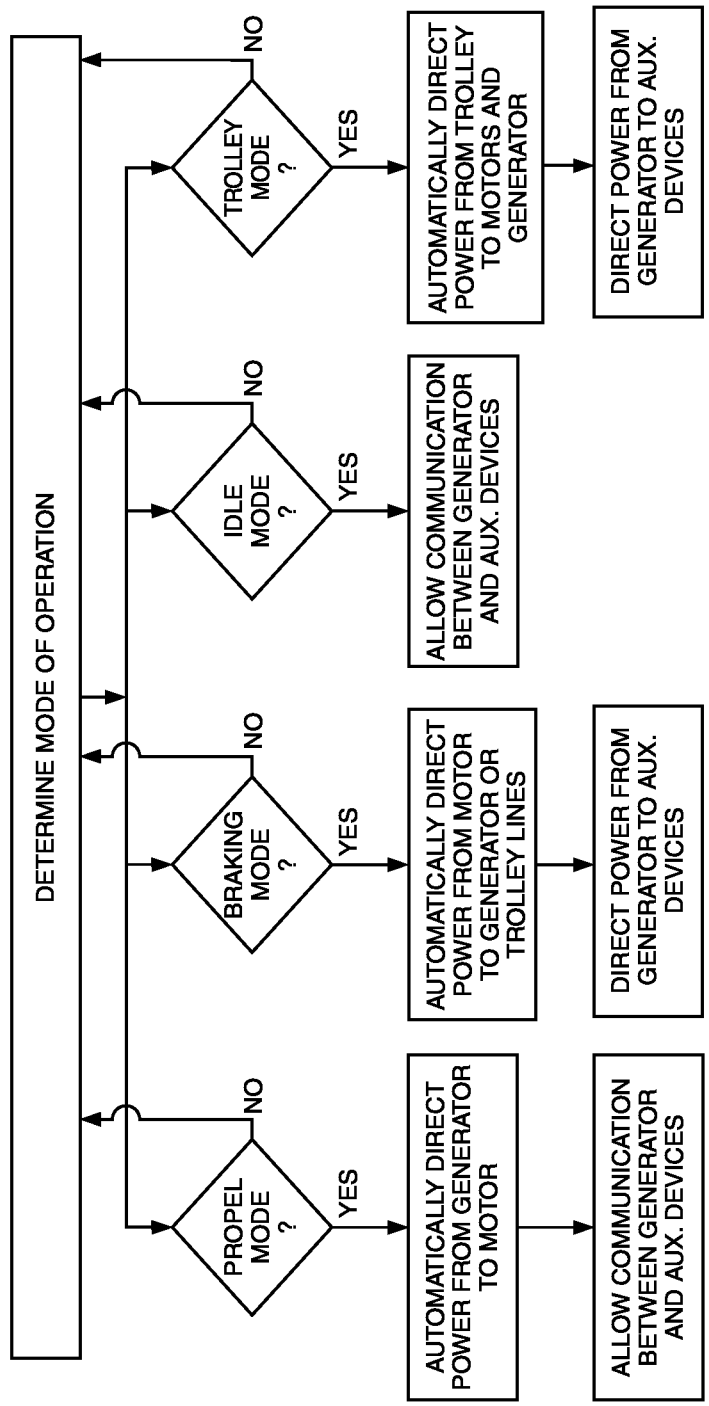
FIG. 7 is a flow diagram of an exemplary method for eliminating fuel consumption in an electric drive machine during trolley application.

FIG. 7 diagrammatically illustrates an exemplary method by which such a controller 200 may operate the drive system 100. In an initial step, the controller 200 may determine the current mode of operation of the machine 102. For example, based on the input signals at nodes 202, 204, the controller 200 may determine if the machine 102 is in a propel mode, dynamic braking or retarding mode, an idling mode, trolley mode, or any other operating mode available on the machine 102. Based on the input signals at nodes 202, 204, the controller 200 may further determine if there is to be a change in the operating mode. Specifically, the controller 200 may determine the current and/or next operating mode based on, for example, the current speed, the payload, the rate of acceleration, the inclination of the machine, the desired speed, the rate of change of the command to retard the machine 102, and the like. In a propel mode, the drive system 100 may be configured to at least automatically direct power from the generator 106 or the trolley drive arrangement 109, as well as any power supplied by the auxiliary devices 116, to the motor 108 to drive the wheels 110. Moreover, the drive system 100 may allow any communication of power from the generator 106 or trolley drive arrangement 109 to the auxiliary devices 116, and if applicable, from the auxiliary devices 116 to the generator 106 or back to the trolley lines 111. In a trolley attached mode, the drive system 100 may be configured to at least automatically direct power from the trolley drive arrangement 109, as well as any power supplied by the auxiliary devices 116, to the motor 108 to drive the wheels 110 and to the generator 106 to at least partially drive the engine 104 and allow the engine 104 to be powered off, or stop fuel supply to the engine 104. In a dynamic braking or retarding mode, the drive system 100 may be configured to at least automatically direct power generated by the motor 108 to the generator 106 or trolley lines 111 to at least partially drive the engine 104 and allow the engine 104 to be powered off, or stop fuel supply to the engine 104, or direct a portion of the energy back to the trolley lines 111 through the trolley drive arrangement 109 for storage a central substation (not shown). The drive system 100 may further direct power from the generator 106 to the auxiliary devices 116. In an optional idling mode, the drive system 100 may automatically allow any intercommunication of power between the generator 106 and the auxiliary devices 116. During such an idling mode, the hybrid system 132 may store enough charge to allow the engine 104 to be powered off, or stop fuel injection, and further, allow the auxiliary devices 116 to operate without any power from the generator 106 or trolley drive arrangement 109. In such a way, the auxiliary devices 116 may provide enough power to spin the engine 104 and drive the parasitic loads 126 of the engine 104, rapidly spin up the engine 104 when shifting into a propel mode, or even start the engine 104 from a stand still, all without any consumption of fuel.

Figure 8:
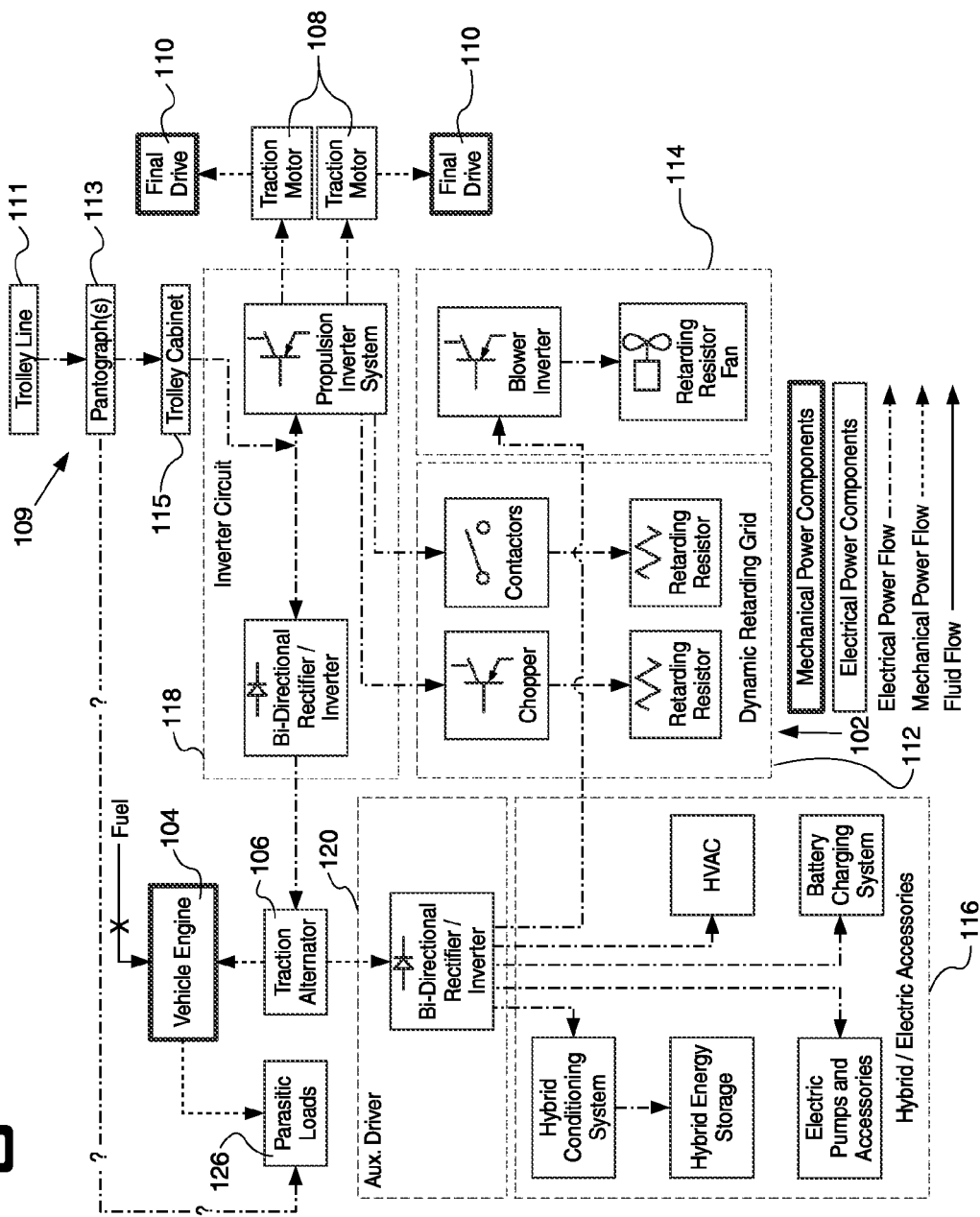
FIG. 8 is a diagrammatic view of an electric drive machine in a propel mode during trolley operation.

FIG. 8 diagrammatically illustrates the machine 102 operating in a trolley propel mode. The trolley propel mode may be desired if the combination of parameters provided to the controller 200 indicates, for example, that a desired speed is greater than a current detected speed and/or that the machine 102 is to be accelerated or is beginning a climb or starting to descend on a mine haul road and that connection to the trolley lines 111 is actuated. During the trolley propel mode, the trolley drive arrangement 109 may serve as the primary source of power of drive and allow the engine 104 to power down and stop the consumption of fuel. Electrical energy from the trolley lines 111 is directed by the pantographs 113 to the trolley cabinet 115 and then be automatically passed through the inverter circuit 118 to drive the one or more motors 108 and wheels 110. During the trolley propel mode, the auxiliary driver 120 allows bidirectional communication between the generator 106 and the auxiliary devices 116. For instance, the electrical energy from the trolley lines 111 may be passed through the auxiliary driver 120 to be converted into DC power and transmitted to a DC bus 146 shared by the auxiliary devices 116. The electrical energy from the trolley lines 111 may also be directed to the generator 106 and acting as a motor used to turn the engine so as to operate the auxiliary devices 116 such as by belts, couplings or other connection. Alternatively, energy generated by any alternate energy source, such as the hybrid system 132, may supply power through the DC bus 146 and the generator 106 to assist the engine 104 or to be sent back to the trolley lines 111 for storage. Accordingly, the direction of power flow through the auxiliary driver 120 may depend on the instantaneous needs and/or capabilities of the drive system 100. The retarding grid 112 and the grid cooling system 114 may be disabled during the propel mode but may continue to operate the grid cooling system 114 to prevent over shoot.

Figure 9:
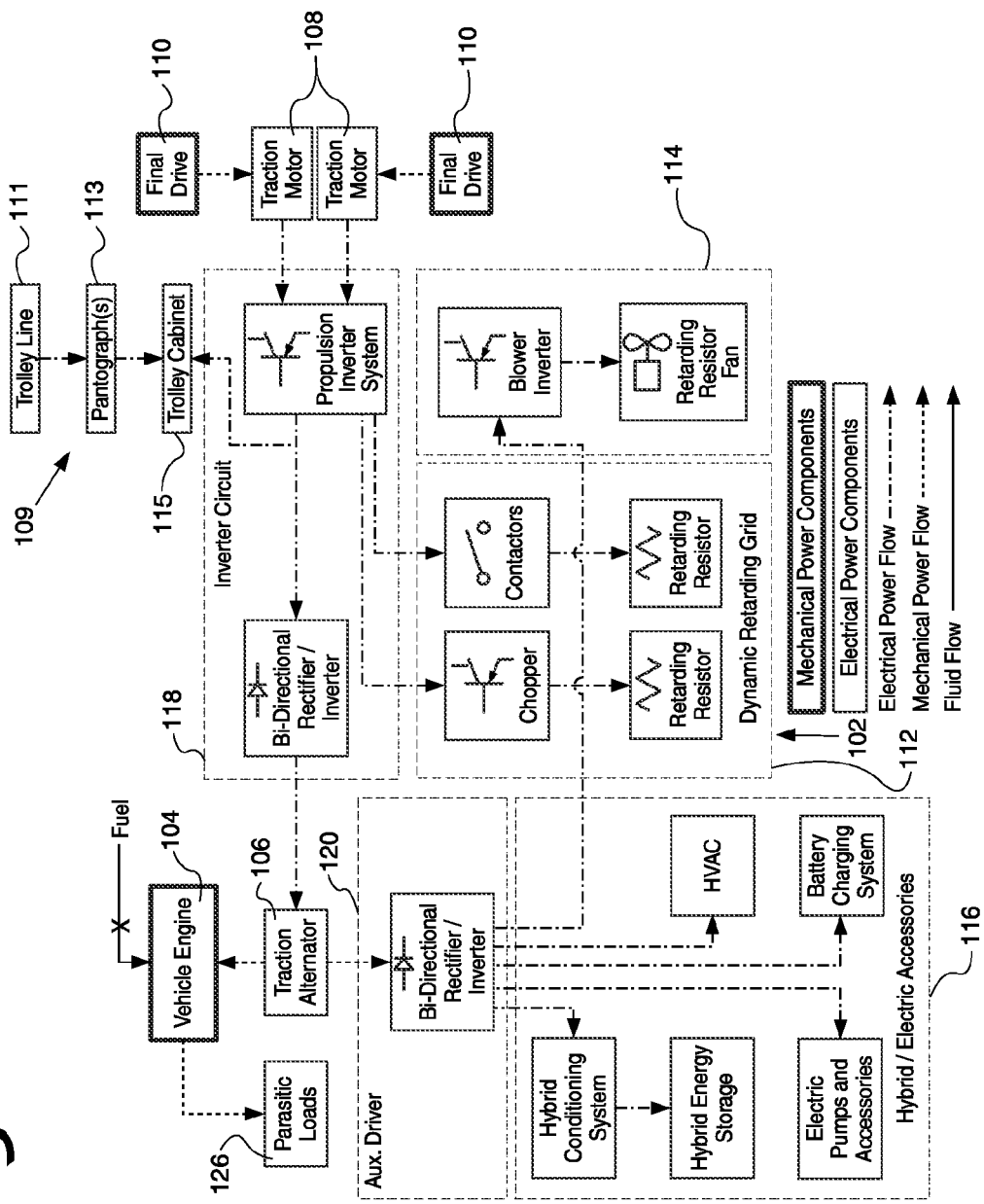
FIG. 9 is a diagrammatic view of an electric drive machine in a dynamic braking mode during trolley operation.

FIG. 9 diagrammatically illustrates the machine 102 operating in a dynamic braking or retarding mode. The dynamic braking mode may be desired if the combination of parameters provided to the controller 200 indicates, for example, that the desired speed is less than a current detected speed and/or that the machine 102 is to be decelerated. During the dynamic braking mode, the one or more wheels 110 and motors 108 may serve as the primary power source. Moreover, rotation of the wheels 110 may turn the one or more motors 108 and cause the motors 108 to supply electrical energy in the form of, for example, AC power. As the inverter circuit 118 is bidirectional, the inverter circuit 118 may receive the electrical energy provided by the motors 108 and convert the AC power into DC. The DC power may then be sent back to the trolley lines 111 or adjusted and converted back into AC power, and supplied to the generator 106. The inverter circuit 118 may further apply the DC power to the retarding grid 112, or the chopper and/or contactor circuits 154, to be used by the auxiliary devices 116, or snet to the retarding grid 112, to be dissipated in the form of heat. The power supplied to the generator 106 may be used to mechanically drive the engine 104 temporarily eliminate the use of fuel during the dynamic braking mode of operation. The power supplied to the generator 106 may further be used to supply energy to the auxiliary devices 116 via the auxiliary driver 120. In particular, the auxiliary driver 120 may convert the AC power provided to the generator 106, the DC motor 154 or additional windings 144 into DC power to be passed along to the DC bus 146. The DC power may be used to power the auxiliary devices 116 attached to the DC bus 146. Among other things, the DC power may be used to supply power to the grid cooling system 114, or blower inverter and blower motor 148, so as to cool the retarding grid 112. In such a way, power to the grid cooling system 114 may be controlled independently from the retarding grid 112. This allows the grid cooling feature to be accessible during any other operating mode as needed via the auxiliary driver 120. As control of the grid cooling system 114 is not limited to the retarding mode, the retarding grid 112 may be cooled even after exiting the retarding mode so as to minimize, for instance, temperature overshoot conditions commonly associated with the resistive elements and/or insulators of retarding grids 112.

Figure 10:
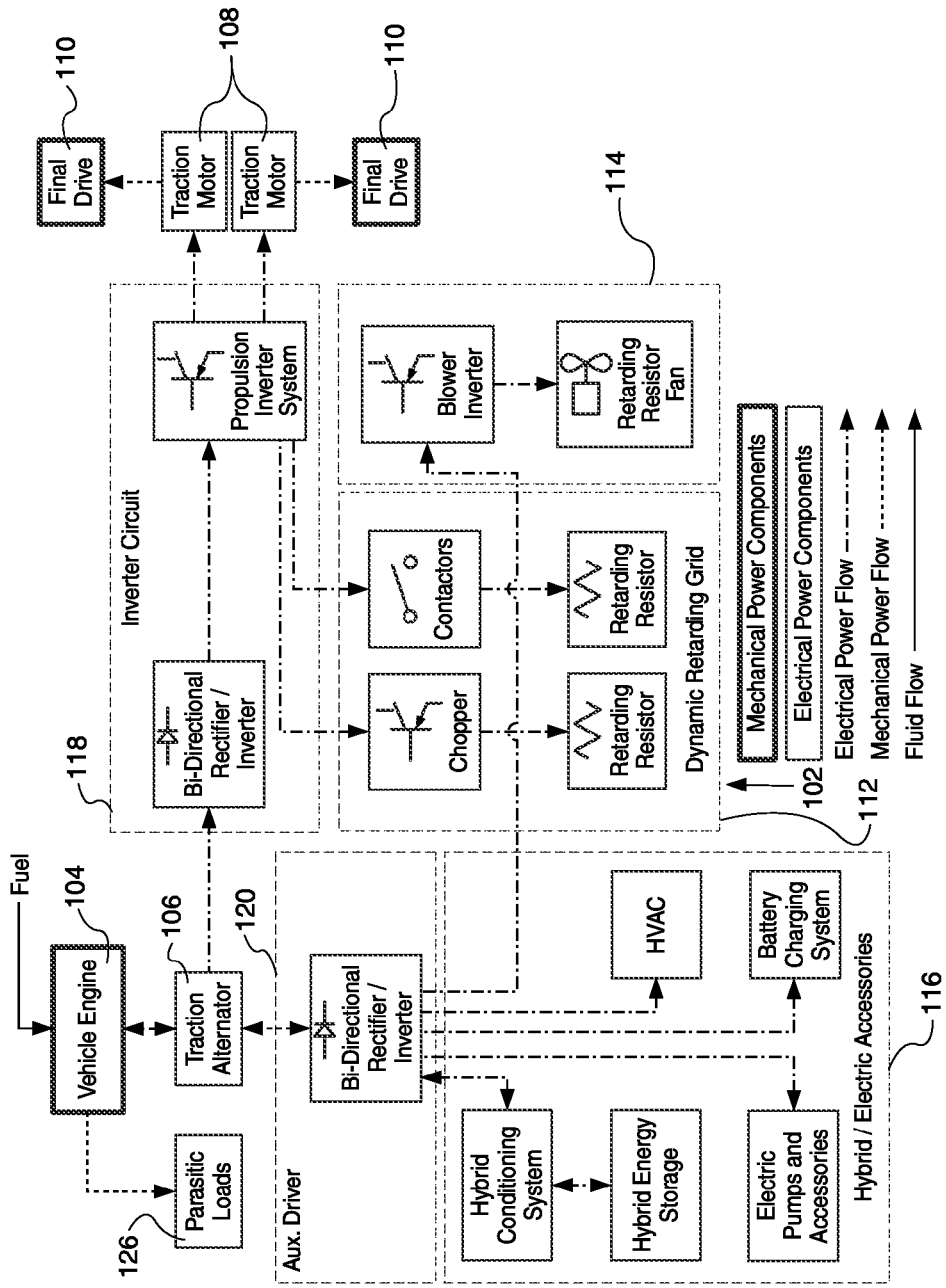
FIG. 10 is a diagrammatic view of an electric drive machine in an idling mode of operation.

In a further modification, the machine 102 may operate in an optional idling mode as diagrammatically shown in FIG. 10. The idling mode may be desired if the combination of parameters provided to the controller 200 indicates, for example, that the desired and current speeds are null and/or that there is no desired acceleration or deceleration. During the idling mode, the engine 104 may be supplied with enough fuel to maintain the idle. Optionally, once the energy storage device 134 is fully charged, the controller 200 may automatically enable engine shutoff to conserve fuel while power supplied by the energy storage device 134 may be used to maintain the idle. As there is no movement in the wheels 110 during the idling mode, the inverter circuit 118 and the retarding grids 112 may be temporarily disabled. In the machine 102 having a hybrid system 132 installed thereon, power may be initially supplied by the energy storage device 134 to operate, for example, battery charging devices 138 as well as electric pumps and accessories 140. If the charge of the energy storage device 134 reaches a preset minimum threshold, the controller 200 may enable the inverter 124 of the auxiliary driver 120 to supply power to the generator 106 and invoke the engine 104 to start. While the engine 104 is idling, the inverter 124 of the auxiliary driver 120 may begin drawing power from the generator 106 or use the trolley drive arrangement to power the generator 106 to operate the electric pumps and accessories 140 and also to recharge the energy storage device 134.

INDUSTRIAL APPLICABILITY

Exemplary off-highway trucks are commonly used in mines, construction sites and quarries. The off-highway trucks may have payload capabilities of 100 tons or more and travel at speeds of 40 miles per hour or more when fully loaded.

Such work trucks or machines must be able to negotiate steep inclines and operate in a variety of different environments. In such conditions, these machines frequently enter into a trolley propel mode and a dynamic braking or retarding mode of operation for extended periods of time. It is a shared interest to minimize or eliminate the amount of fuel consumed during such Trolley propel and dynamic braking modes and make efficient use of the power generated by the traction motors without adversely affecting overall machine performance. The systems and methods disclosed herein allow the drive systems of electric drive machines to completely eliminate fuel consumption during trolley propel and dynamic braking modes while supplying regenerative power to machine subsystems and accessories. The disclosed systems and methods further allow independent control of at least a grid cooling system so as to minimize overheating of the retarding grid regardless of the mode of operation.

From the foregoing, it will be appreciated that while only certain examples have been set forth for the purposes of illustration, alternatives and modifications will be apparent from the above description to those skilled in the art. These and other alternatives are considered equivalents and within the spirit and scope of this disclosure and the appended claims.

What is claimed is:

1. A drive system for a machine having an engine coupled to a generator, a motor operatively coupled to drive wheels, and auxiliary devices, the drive system comprising:
    an inverter circuit coupled to each of the generator and the motor;
    a trolley drive arrangement coupled to the inverter circuit and configured to automatically communicate external power to the motor and to the generator in a trolley propel mode and to automatically communicate power from the motor to the generator and the trolley drive arrangement in a dynamic braking mode, thereby back driving the engine and allowing the supply of fuel to be shut off during the trolley propel and dynamic braking modes.

2. The drive system for the machine in claim 1 including an auxiliary driver coupled to each of the generator and the auxiliary devices, the inverter circuit and the auxiliary driver configured to automatically communicate power from the trolley drive arrangement and any power from the auxiliary devices to the motor in a propel mode, and automatically communicate power from the motor to the generator and the trolley in a dynamic braking mode so as to eliminate fuel consumption during the dynamic braking and mode trolley mode.

3. The drive system of claim 2, wherein the auxiliary driver includes at least one of an auxiliary generator and a winding assembly coupled to the generator and electrically coupled to the auxiliary devices.

4. The drive system of claim 3, wherein the auxiliary driver includes a bidirectional inverter enabling bidirectional electrical communication between the generator and the auxiliary devices.

5. The drive system of claim 3, wherein the inverter circuit includes one or more of an inverter and a rectifier configured to automatically communicate electrical power from the generator to the motor so as to at least partially drive the drive wheels during the propel mode, and automatically configured to communicate electrical power from the motor to the generator so as to transmit power to the engine during the trolley mode.

6. The drive system of claim 3, wherein the inverter circuit includes a bidirectional inverter configured to automatically communicate electrical power from the generator to the motor so as to at least partially drive the drive wheels during the propel mode, and automatically communicate electrical power from the motor to the generator so as to transmit power to the engine during the dynamic braking mode.

7. The drive system of claim 3, wherein the auxiliary driver is configured to at least partially communicate power from the motor to the auxiliary devices during the dynamic braking mode.

8. The drive system of claim 3, wherein the auxiliary driver includes a motor generator mechanically coupled to the motor and an auxiliary generator mechanically coupled to the engine, the motor generator and the auxiliary generator configured to communicate power from the motor to the engine during the dynamic braking mode.

9. The drive system for the machine in claim 1 including an auxiliary driver coupled to each of the generator and the auxiliary devices, the inverter circuit and the auxiliary driver configured to automatically communicate power from the trolley drive arrangement to power any auxiliary devices and the motor in a propel mode, and automatically communicate power from the trolley to the auxiliary devices and the generator in a dynamic braking mode so as to eliminate fuel consumption during the dynamic braking mode and trolley mode.

10. The drive system of claim 9, wherein the auxiliary driver includes at least one a DC motor electrically coupled to the auxiliary devices.

11. The drive system of claim 10, wherein the auxiliary driver transmits electrical power to a DC bus during the trolley mode, the auxiliary devices are configured to draw electrical power from the DC bus during the dynamic braking mode.

12. The drive system of claim 10, wherein the auxiliary driver includes a DC/DC converter enabling electrical communication between the trolley drive arrangement and the DC bus and power the DC motor through a contactor from the DC bus to power the generator.

13. The drive system of claim 10, wherein the auxiliary driver includes a rectifier enabling unidirectional electrical communication between the DC motor and the auxiliary devices.

14. The drive system of claim 1, wherein the inverter circuit is electrically coupled to a retarding grid and the auxiliary driver is in electrical communication with a grid cooling system, control of the grid cooling system being independent from control of the retarding grid.

15. An electric drive machine, comprising:
an engine;
a generator operatively coupled to the engine;
a motor operatively coupled to one or more drive wheels;
a inverter circuit coupled to each of the generator and the motor;
a trolley drive arrangement coupled to the inverter circuit;
an auxiliary DC bus connected to a plurality of auxiliary devices;
an auxiliary driver connected to each of the generator and the auxiliary devices, the auxiliary driver configured to transmit power to the auxiliary DC bus during a trolley propel mode and a dynamic braking mode;
a one of the inverter circuit and the auxiliary driver configured to automatically communicate power from the trolley drive arrangement to the motor and the auxiliary devices in the trolley propel mode, and automatically communicate power from the motor to the generator and the trolley drive arrangement in a dynamic braking mode, thereby back driving the engine and allowing the supply of fuel to be shut off during the trolley propel and dynamic braking modes;
a retarding grid coupled to the inverter circuit; and
a grid cooling system coupled to the auxiliary DC bus and configured to selectively cool the retarding grid, control of the grid cooling system being independent from control of the retarding grid.

16. The electric drive machine of claim 15, wherein the auxiliary driver includes at least one of an auxiliary generator, a winding assembly and a bidirectional inverter enabling bidirectional electrical communication between the generator and the DC bus.

17. The electric drive machine of claim 15 further comprising one or more of a hybrid system, an energy storage device, a charging device, and a heating, ventilation and air-conditioning HVAC system coupled to the DC bus.

18. The drive system of claim 15, wherein the auxiliary driver includes at least one motor electrically coupled to the auxiliary devices, the auxiliary driver transmits electrical power to a DC bus during the trolley mode, the auxiliary devices are configured to draw electrical power from the DC bus during the dynamic braking mode and back drive the engine.

19. The drive system of claim 18, wherein the auxiliary driver includes a DC/DC converter enabling electrical communication between the trolley drive arrangement and the DC bus and power a DC motor through a contactor from the DC bus to power the generator and back drive the engine.

20. A method for back driving an engine and allowing the supply of fuel to be shut off to the engine on an electric drive machine, the electric drive machine having the engine coupled to a generator, a motor operatively coupled to drive wheels, and auxiliary devices, the method comprising the steps of:
providing an inverter circuit in electrical communication between the generator and the motor;
providing an auxiliary driver in electro-mechanical communication between the generator and the auxiliary devices;
determining a current mode of operation of the electric drive machine;

automatically directing electrical power from the trolley drive arrangement to the motor in trolley propel mode through at least one of the inverter circuit and the auxiliary driver if the current mode of operation is in trolley mode; and automatically directing electro-mechanical power from the motor to a one of the engine and the trolley drive arrangement in a dynamic braking mode through at least one of the inverter circuit and the auxiliary driver if the current mode of operation is in a dynamic braking mode.

21. The method of claim 20, wherein the auxiliary driver includes at least one of an auxiliary generator, a winding assembly and a DC motor coupled to each of the generator and auxiliary devices.

22. The method of claim 20, wherein the inverter circuit includes an inverter configured to automatically communicate electrical power from the trolley drive arrangement to the motor so as to drive the drive wheels during the trolley mode, and automatically communicate electrical power from the motor to a one of the generator and the trolley drive arrangement so as to transmit power to the engine during the dynamic braking mode.

23. The method of claim 20, wherein the inverter circuit is electrically coupled to a retarding grid and the auxiliary driver is in electrical communication with a grid cooling system, control of the grid cooling system being independent from control of the retarding grid.

24. The method of claim 20 further comprising the step of automatically communicating power only between the auxiliary devices and the engine via the generator if the current mode of operation is in an idling mode.

\* \* \* \* \*